(12) United States Patent
Maybee et al.

(10) Patent No.: US 6,245,130 B1
(45) Date of Patent: Jun. 12, 2001

(54) FILTER SYSTEM

(76) Inventors: Philip D. Maybee, 15844 FM 1485, Conroe, TX (US) 77306; Guy L. McClung, 8310 Vintage Creek, Spring, TX (US) 77379

( * ) Notice: Subject to any disclaimer, the term of this patent is extended or adjusted under 35 U.S.C. 154(b) by 0 days.

(21) Appl. No.: 09/342,286

(22) Filed: Jun. 29, 1999

(51) Int. Cl.$^7$ .................................................. B01D 46/02
(52) U.S. Cl. .......................... 95/286; 55/341.2; 55/378; 55/502; 55/DIG. 26; 210/450; 210/452
(58) Field of Search .................. 55/341.1, 341.2, 55/341.4, 341.7, 350.1, 378, 502, DIG. 26, DIG. 12; 95/286; 210/323.1, 450, 451, 452

(56) References Cited

U.S. PATENT DOCUMENTS

| | | | |
|---|---|---|---|
| 2,135,863 | 11/1938 | Walker | 55/494 |
| 3,057,481 | 10/1962 | Pall . | |
| 3,177,636 | * 4/1965 | Jensen . | |
| 3,249,228 | * 5/1966 | Arvanitakis . | |
| 3,299,660 | 1/1967 | Sullivan . | |
| 3,372,870 | 3/1968 | Norris et al. . | |
| 3,405,758 | 10/1968 | Walker et al. . | |
| 3,451,197 | * 6/1969 | Ballard . | |
| 3,486,626 | 12/1969 | Close | 55/498 |
| 3,640,392 | * 2/1972 | Smith et al. . | |
| 3,747,772 | 7/1973 | Brown | 210/493 |
| 3,830,042 | * 8/1974 | MacDonnell . | |
| 3,834,134 | * 9/1974 | McAllister . | |
| 3,853,529 | 12/1974 | Boothe et al. | 55/499 |
| 3,871,848 | * 3/1975 | Smith . | |
| 4,007,026 | 2/1977 | Groh | 55/498 |
| 4,081,379 | * 3/1978 | Smith . | |
| 4,135,900 | 1/1979 | Westlin et al. | 55/499 |
| 4,157,964 | * 6/1979 | Rishel . | |
| 4,187,091 | 2/1980 | Durre et al. | 210/493.1 |
| 4,218,227 | 8/1980 | Frey | 55/302 |
| 4,290,790 | 9/1981 | Okubo | 55/379 |
| 4,356,012 | * 10/1982 | Hofstetter . | |
| 4,511,320 | 4/1985 | Lambertus | 425/199 |
| 4,514,875 | 5/1985 | Comer | 15/349 |
| 4,617,122 | 10/1986 | Kruse et al. | 210/493.3 |
| 4,648,889 | * 3/1987 | Jensen . | |
| 4,746,339 | 5/1988 | Millard | 55/302 |
| 5,061,303 | * 10/1991 | Williams et al. . | |
| 5,624,559 | * 4/1997 | Levin et al. . | |
| 5,667,545 | * 9/1997 | Honda et al. . | |
| 5,840,188 | 11/1998 | Kirsgalvis | 210/448 |
| 5,904,743 | * 5/1999 | Jensen . | |
| 5,989,421 | * 11/1999 | Davis et al. . | |
| 6,126,708 | * 10/2000 | Mack et al. . | |

* cited by examiner

Primary Examiner—Duane Smith
Assistant Examiner—Fred Prince
(74) Attorney, Agent, or Firm—Guy McClung

(57) ABSTRACT

A bag filter system for filtering fluid has been invented which has, in certain aspects, a mount apparatus having at least one mount opening therethrough for emplacement therethrough of part of a bag filter, at least one bag filter having a support member and filter material connected to the support member, the filter material suitable for insertion through the at least one mount opening of the mount apparatus, the support member having a fluid opening through which the fluid is flowable to the filter material, an interface between the support of the at least one bag filter housing member and the mount apparatus, and a seal member encompassing the support member/mount apparatus interface and interposed therebetween to inhibit fluid leakage through said interface. The bag filter system's seal member in certain aspects is a seal member around the fluid opening, and a mount apparatus seal member is disposed around the at least one mount opening. Such a system may be used with filters and filter systems other than bag filter systems.

17 Claims, 4 Drawing Sheets

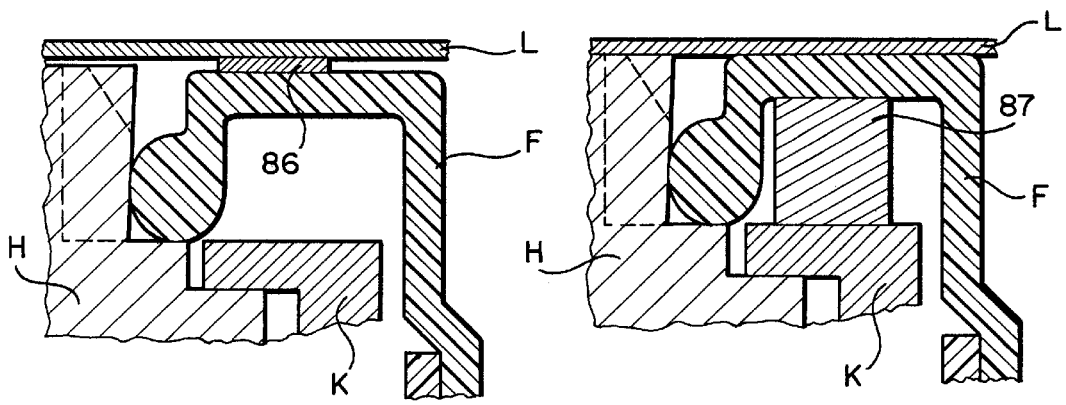
FIG. 7A  FIG. 7B
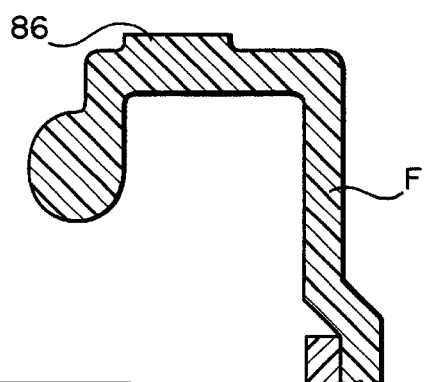 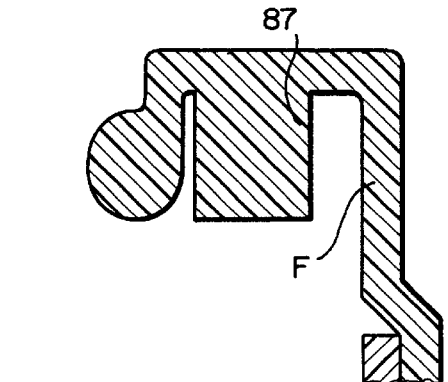
FIG. 7C  FIG. 7D
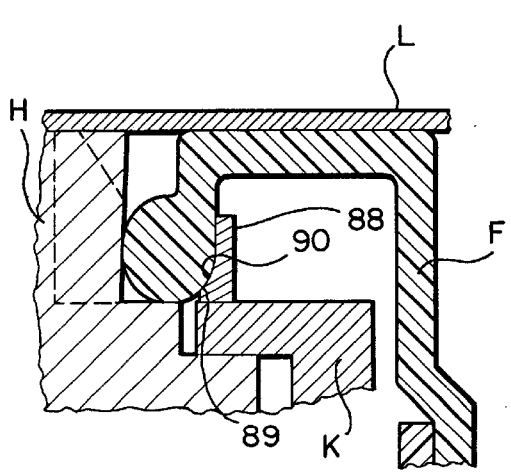 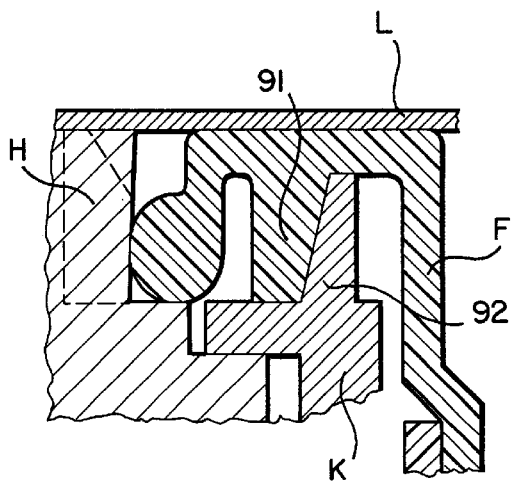
FIG. 7E  FIG. 7F

FILTER SYSTEM

BACKGROUND OF THE INVENTION

1. Field Of The Invention

This invention is directed to filters, filter systems, bag filters, bag filter systems and in one aspect, to sealed mounts for filters for such systems.

2. Description of Related Art

Filters, filter systems and bag filters are well known in the prior art. Many industrial filtering systems with bag filters are air pollution control situations to separate air borne particulate material from a gas or gas mixture such as air, most or all of the particulate material being retained in the filtering apparatus for collection and eventual discharge with the cleaned air being delivered to atmosphere or an air circulatory system.

Certain prior art bag filters are tubular bags of filtering fabric with straight walls and generally of elongate cross-section. Many have internal reinforcement to resist collapse during the passage of the air through them.

Typically bag filters are removably mounted on and/or secured to a mounting apparatus, frame or plate, with or without holding brackets on angle pieces.

Various prior art filter bags have a rigid holding member or ring to which the filter fabric is connected. The filter bag is emplaced through an opening in a mounting frame or structure and the rigid holding member or ring contacts and abuts the mounting frame or structure. It is possible for fluid directed to the filter bag to flow out between the mounting frame/holding member interface rather than into and through the filter fabric. Such leaks reduce filtration efficiency and result in pollution of the environment.

U.S. Pat. No. 4,746,339 discloses a filter with pleated fabric filter bag of generally rectangular configuration within which is removably disposed an internal reinforcing cage of wire or rigid plastics material. The pleated fabric filter bag has an open end and a closed end and at its open end there is molded integrally with the bag an apertured plastics end cap which has an internal configuration corresponding to the pleated fabric bag. The closed end of the bag is sealed either by the bag material or by an integrally molded imperforate plastics end cap. The filter can be disposed vertically or horizontally within the casing of a filtering apparatus and if disposed horizontally it can be stacked in vertical array.

U.S. Pat. No. 5,840,188 discloses a filter system with liquid filter housing and filter bag assembly includes a reticulated basket fitted within a housing chamber and supported by the housing, and a replaceable filter bag positioned within the reticulated basket. The filter bag includes a flexible flange which terminates with a bulbous lip which frictionally engages the housing to secure and seal the bag at the housing and basket.

There has long been a need for a bag filter system in which the leaks between the filter units and mounting apparatus are inhibited or eliminated. There has long been a need for such an apparatus which is simple, easily made, and easily installed. There has long been a need for a more efficient bag filter system.

SUMMARY OF THE PRESENT INVENTION

The present invention discloses, in one embodiment, a bag filter, a mount for such a filter, and a system with such filters and mounts.

The present invention, in certain embodiments, discloses a bag filter system with one or more bag filters removably emplaced in a mounting structure. A rigid support holding member, or ring of the bag filter abuts part of the mounting structure. A seal member, e.g. a sealing gasket, a sealing O-ring, or other sealing material is emplaced between the rigid support (or holding member) and the mounting structure to inhibit or eliminate fluid leakage between the interface of these two members. Filter fabric is connected to the rigid support, holding member, or ring.

In certain aspects, the seal member is secured to or formed integrally of the filter bag's rigid support, holding member, or ring. In other aspects, the seal member is secured to or formed integrally of the mounting structure. In other embodiments one or more seal members are used on both the rigid support, etc. and on the mounting structure. In certain embodiments a seal member on a rigid support contacts a seal member on a mounting structure for enhance leakage inhibition.

Any seal member of a system according to the present invention may be of any desired and suitable dimensions and configuration and may be made of any known suitable sealing material. The seal(s), filter(s), filter mount(s) and system(s) disclosed herein may be used with systems other than bag filter systems.

What follows are some of, but not all, the objects of this invention. Objects other than the specific objects stated below, additional objects and purposes will be readily apparent to one of skill in this art who has the benefit of this invention's teachings and disclosures. It is, therefore, an object of at least certain preferred embodiments of the present invention to provide new, useful, unique, efficient and nonobvious bag filter apparatus and bag filter mounts for bag filter systems.

An additional object of at least certain preferred embodiments of the present invention is the provision of such apparatuses and systems in which fluid leaks around filter mount parts are inhibited or eliminated;

A further object of the present invention is the provision of such mounts, filters, and systems which are easily installed and easily replaced; and Another object of the present invention is the provision of such filters and systems useful in already existing mounts and housings, mounting frames, and mounting structures.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIGS. 7A, 7B, 7E, 7F are side cross-section views of a bag filter system according to the present invention. FIGS. 7C and 7D are side cross section views of a bag filter according to the present invention.

DESCRIPTION OF EMBODIMENTS PREFERRED AT THE TIME OF FILING FOR THIS PATENT

Figure 1A:
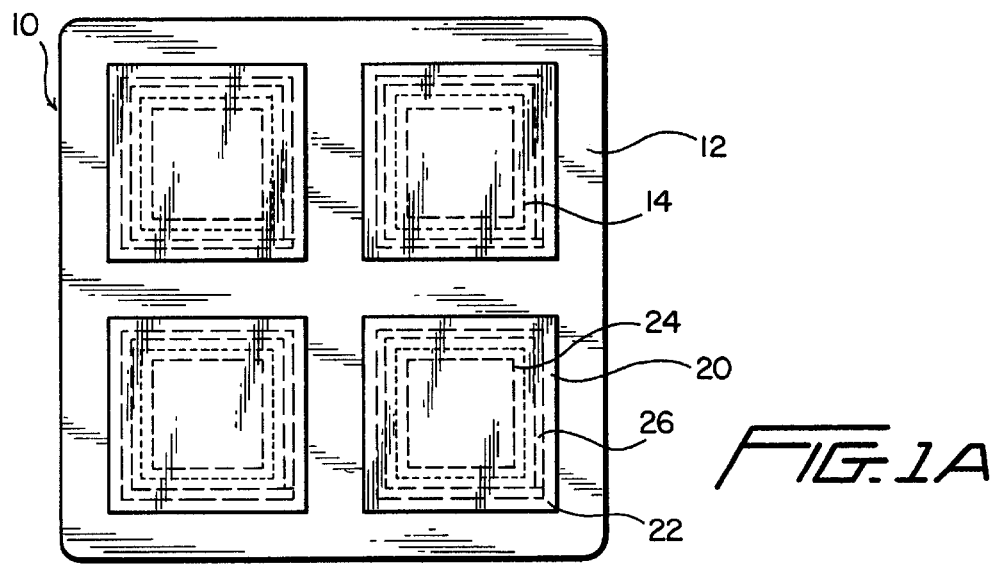
FIG. 1A is a top plan view of a bag filter system according to the present invention.
Figure 1B:
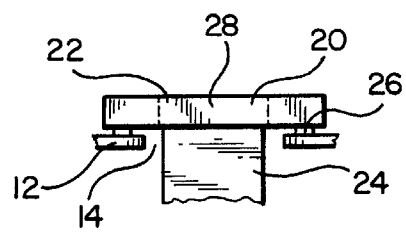
FIG. 1B is a side view of a bag filter of the system of FIG. 1A in place in a mounting structure.
Figure 1C:
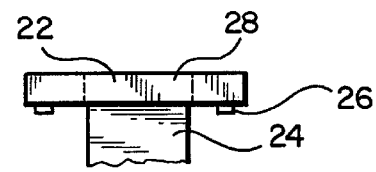
FIG. 1C is a side view of a bag filter of the system of FIG. 1A.

FIG. 1A shows a bag filter system 10 according to the present invention with a mount structure 12 having a plurality of openings 14. Bag filters 20 each have a support 22 to which is secured filter fabric 24. A sealing gasket 26 secured to the support 22 encompasses an opening 28 through the support 22 as well as the filter fabric 24. The gasket 26 is positioned so that it abuts the mount structure 12 and encompasses an opening 14 through which the filter fabric 24 extends.

Figures 2, 4A, 4B:
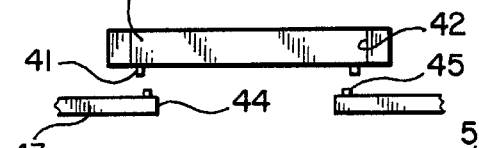
FIG. 2 is a side view of the part of a mounting structure according to the present invention.
FIGS. 4A–4C are side view of a bag filter and mounting structure according to the present invention.

FIG. 2 shows an alternative mount structure 12a with a sealing gasket 26a secured thereto. This may be used instead of or in addition to the gasket 26.

Figure 3:
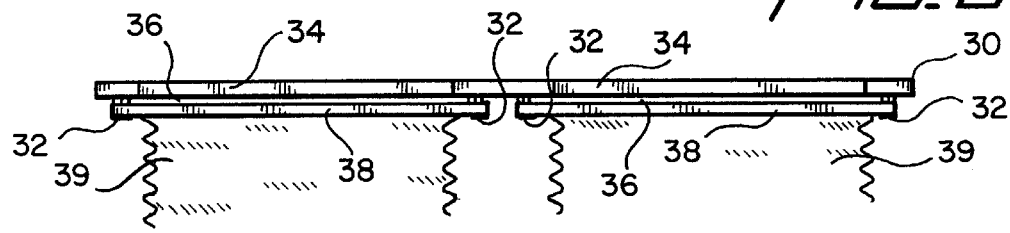
FIG. 3 is a side view of the part of a mounting structure according to the present invention.

FIG. 3 shows a mount structure 30 according to the present invention with brackets 32 for releasably holding bag filters 38 with filter fabric 39 (e.g., but not limited to with supports 22 of FIG. 1A). Fluid to be filtered flows through openings 34. A sealing gasket 36 encompasses each opening 34 (which may be circular, rectangular, oval or any desired shape). Although two openings 34 and two bag filters 38 are shown, it is within the scope of this invention to have one, two, three, four–eight, or any desired number of openings and filters (as is true of any system disclosed herein).

FIG. 4A shows a bag filter support 40 with a seal gasket 41 encompassing a fluid flow opening 42 for use with a mount apparatus 43 having an opening 44 (through which extends filter fabric, not shown, connected to the support 40) and a seal gasket 45 that encompasses the opening 44. In use, the seal gasket 41 sealingly abuts the mount apparatus 43 and the seal gasket 45 sealingly abuts the support 40.

FIG. 4B shows a bag filter support 46 with a seal gasket 47 encompassing a fluid flow opening 48 for use with a mount apparatus 49 having an opening 50 (through which extends filter fabric, not shown, connected to the support 46) and a seal gasket 51 that encompasses the opening 50. In use, the seal gasket 47 sealingly abuts the mount apparatus 49 and the seal gasket 51 sealingly abuts the support 46.

Figure 4C:
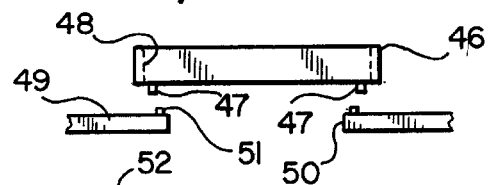

FIG. 4C shows a bag filter support 52 with a seal gasket 53 encompassing a fluid flow opening 54 for use with a mount apparatus 55 having an opening 56 (through which extends filter fabric, not shown, connected to the support 52) and a seal gasket 57 that encompasses the opening 56. In use, the seal gasket 51 sealingly abuts the seal gasket 57 and is sealingly received in a recess 58 in the seal gasket 57.

Figure 5A:
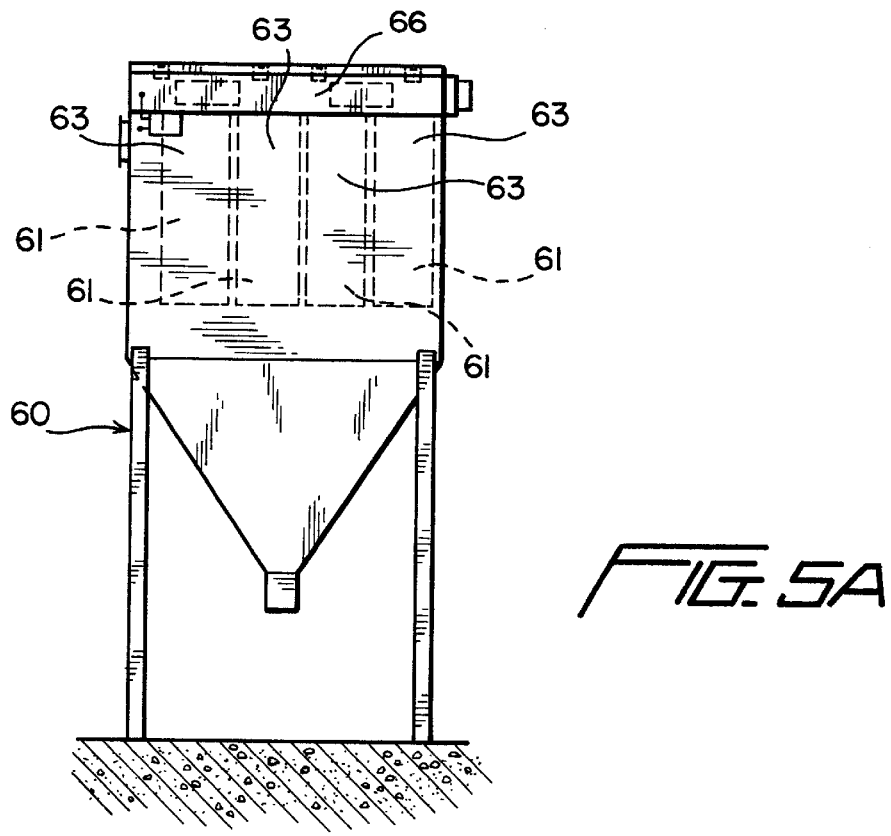
FIG. 5A is a perspective view of a bag filter system according to the present invention.
Figure 5B:
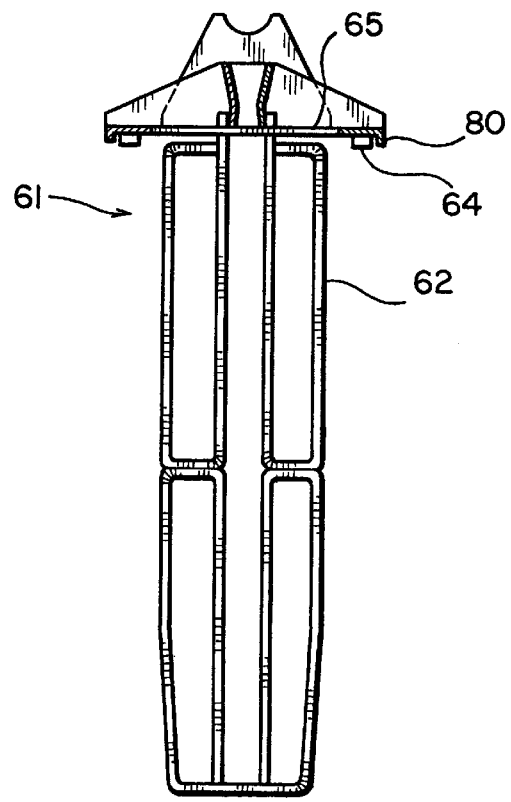
FIG. 5B is a side cross-section view of a bag filter according to the present invention.

FIG. 5A shows a bag filter system 60 according to the present invention which is an improvement of the system disclosed in U.S. Pat. No. 4,746,339. Similar parts in each system are not described here in detail and the description of U.S. Pat. No. 4,746,339 is incorporated here for all purposes. Bag filters 61 each have an internal support cage 62 surrounded by filter fabric 63 (removed in FIG. 5B). A top plate 80 is secured to the cage 62. A sealing gasket 64 encompasses an opening 65 through the plate 80. In use the sealing gasket 64 sealingly abuts a portion of a mount frame 66 and encompasses an opening through which the filter fabric 63 extends. Alternatively or additionally a sealing gasket may be used on the frame 66.

Figure 6A:
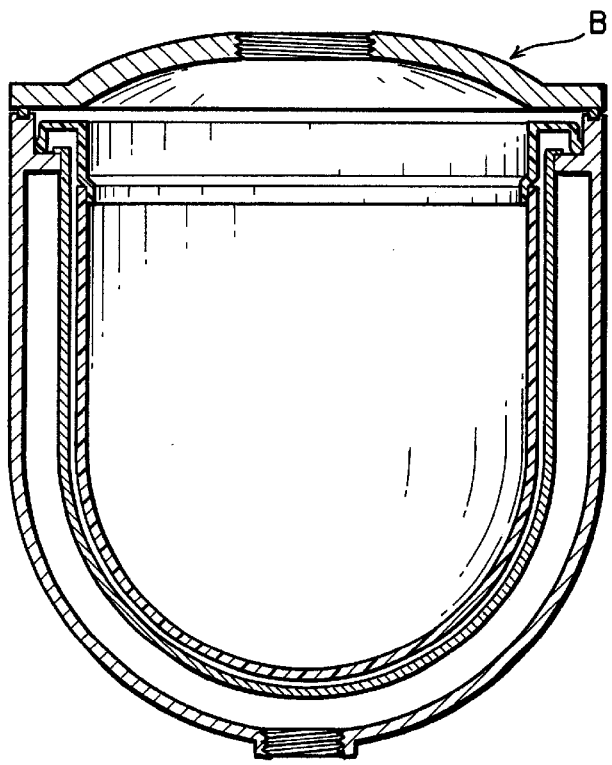
FIG. 6A is a cross-section view of a prior art bag filter and mount.
Figure 6B:
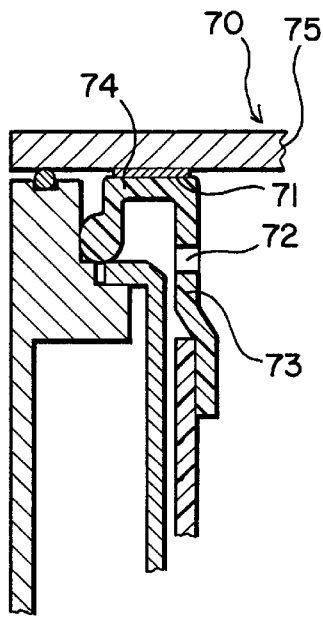
FIGS. 6B and 6C are side cross-section views of a bag filter system according to the present invention.

FIG. 6A shows a prior art bag filter assembly B as disclosed in U.S. Pat. No. 5,840,188 which is incorporated here for all purposes. FIG. 6B shows an improved bag filter assembly like the embodiment of FIG. 6 of U.S. Pat. No. 5,840,188, but with a sealing gasket 71 on a flange 74 encompassing an opening 72 in a support 73. The gasket 71 sealingly abuts a lid 75.

Figure 6C:
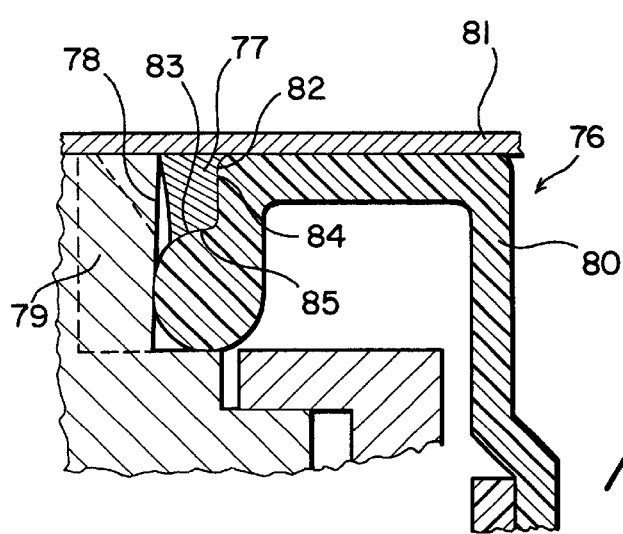

FIG. 6C shows an improved bag filter assembly 76 like that of FIG. 2 of U.S. Pat. No. 5,840,188 but with a sealing gasket 77 encompassing an opening 78 in a housing 79 and sealingly abutting a portion of a bag filter support 80. The gasket 77 is secured to (or may be formed integrally of) a lid 81. Curved portions 82, 83 of the gasket 77 correspond to and sealingly abut curved portions 84, 85, respectively, of the support 80.

FIGS. 7A–7F present variations of the bag filter assemblies disclosed in U.S. Pat. No. 5,840,188 and in FIGS. 6B and 6C. In each of FIGS. 7A–7F a filter assembly h as a lid L, a housing H, a bag filter support F, and a basket K (description of parts in U.S. Pat. No. 5,840,188 incorporated here).

A sealing gasket 86 in FIG. 7A seals the support F/Lid L interface, encompassing fluid flow openings in the support F and lid L.

A sealing gasket 87 in FIG. 7B seals a support F/basket K interface. The gaskets 86 and 87 are shown as secured to a lid L and basket K, respectively ; but as shown in FIGS. 7C and 7D, such gaskets may be secured to or formed integrally of the bag filter support F.

As shown in FIG. 7E a sealing gasket 88 secured to the basket K sealingly abuts the support F and has a curved portion 89 corresponding in shape to a curved portion 90 of the support F.

As shown in FIG. 7F a sealing portion 91 of the support F projects down and sealingly abuts a sealing portion 92 of the basket K. The portion 91 may be a separate piece secured to the support F. The sealing portion 92 may be a separate piece secured to the basket K.

The present invention, therefore, discloses a bag filter system for filtering fluid, the bag filter system having a mount apparatus having at least one mount opening therethrough for emplacement therethrough of part of a bag filter, at least one bag filter having a support member and filter material connected to the support member, the filter material suitable for insertion through the at least one mount opening of the mount apparatus, the support member having a fluid opening through which the fluid is flowable to the filter material, an interface between the support of the at least one bag filter housing member and the mount apparatus, and a seal member encompassing the support member/mount apparatus interface and interposed therebetween to inhibit fluid leakage through said interface.

The present invention, therefore, discloses a filter system for filtering fluid, the filter system having a mount apparatus having at least one mount opening therethrough for emplacement therethrough of part of a filter, at least one filter having a support member and filter material connected to the support member, the filter material suitable for insertion through the at least one mount opening of the mount apparatus, the support member having a fluid opening through which the fluid is flowable to the filter material, an interface between the support of the at least one filter housing member and the mount apparatus, and a seal member encompassing the support member/mount apparatus interface and interposed therebetween to inhibit fluid leakage through said interface.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The invention claimed herein is not obvious in accordance with 35 U.S.C. § 103 and satisfies the conditions for patentability in § 103. This specification and the claims that follow are in accordance with all of the requirements of 35 U.S.C. § 112. The inventor may rely on the Doctrine of Equivalents to determine and assess the scope of the invention and of the claims that follow as they may pertain to apparatus not materially departing from, but outside of, the literal scope of the invention as set forth in the following claims.

What is claimed is:

1. A filter system for filtering fluid, the filter system comprising:

a mount apparatus having at least one rectangular mount opening therethrough for emplacement therethrough of part of a filter, at least one filter having a rectangular support member and filter material connected to the rectangular support member, the filter material suitable for insertion through the at least one rectangular mount opening of the mount apparatus, the rectangular support member having a rectangular fluid opening through which the fluid is flowable to the filter material, an interface between the rectangular support member of the at least one filter and the mount apparatus, a seal member encompassing the rectangular support member/mount apparatus interface and sealingly abutting the mount apparatus and sealingly abutting the rectangular support member and interposed therebetween to inhibit fluid leakage through said interface, and a pair of spaced apart brackets corresponding to each of the at least one rectangular mount openings, each pair of spaced-apart brackets releasably holding a filter over a rectangular mount opening.

2. The filter system of claim 1 wherein the seal member is secured to the rectangular support member.

3. The filter system of claim 1 wherein the seal member is secured to the mount apparatus.

4. The filter system of claim 1 wherein the at least one rectangular mount opening of the mount apparatus is a plurality of openings, and wherein the at least one filter is a plurality of filters, one filter corresponding to each of the plurality of openings.

5. The filter system of claim 1, the seal member comprising a filter seal member around the rectangular fluid opening, and a mount apparatus seal member around the at least one rectangular mount opening.

6. The filter system of claim 5 wherein the filter seal member sealingly contacts the mount apparatus seal member.

7. The filter system of claim 1 wherein the rectangular support member of the at least one filter has a curved portion and the seal member has a curved portion corresponding in shape to the curved portion of the support member, the curved portion of the support member sealingly contacting the curved portion of the seal member.

8. A filter system for filtering fluid, the filter system comprising:

a mount apparatus having at least one rectangular mount opening therethrough for emplacement therethrough of part of a filter, at least one filter having a rectangular support member and filter material connected to the rectangular support member, the filter material suitable for insertion through the at least one rectangular mount opening of the mount apparatus, the rectangular support member having a rectangular fluid opening through which the fluid is flowable to the filter material, an interface between the rectangular support member of the at least one filter and the mount apparatus, and a seal member encompassing the rectangular support member/mount apparatus interface sealingly abutting the mount apparatus and sealingly abutting the rectangular support member and interposed therebetween to inhibit fluid leakage through said interface wherein the at least one rectangular mount opening of the mount apparatus is a plurality of rectangular openings, and wherein the at least one filter is a plurality of filters, one filter corresponding to each of the plurality of rectangular openings, and wherein the rectangular support member of the at least one filter has a curved portion and the seal member has a curved portion corresponding in shape to the curved portion of the rectangular support member, the curved portion of the rectangular support member sealingly contacting the curved portion of the seal member.

9. A method for processing fluid containing contaminants, the method comprising:

feeding the fluid to a filter system, the filter system comprising a mount apparatus having at least one rectangular mount opening therethrough for emplacement therethrough of part of a filter, at least one filter having a rectangular support member and filter material connected to the rectangular support member, the filter material suitable for insertion through the at least one rectangular mount opening of the mount apparatus, the rectangular support member having a rectangular fluid opening through which the fluid is flowable to the filter material, an interface between the rectangular support member of the at least one filter and the mount apparatus, a seal member encompassing the rectangular support member/mount apparatus interface and sealingly abutting the mount apparatus and sealingly abutting the rectangular support member and interposed therebetween to inhibit fluid leakage through said interface, and a pair of spaced apart brackets corresponding to each of the at least one rectangular mount openings, each pair of spaced-apart brackets releasably holding a filter over a rectangular mount opening, and filtering contaminants from the fluid with the filter system.

10. The method of claim 9 wherein the at least one rectangular mount opening of the mount apparatus is a plurality of openings, and wherein the at least one filter is a plurality of filters, one filter corresponding to each of the plurality of rectangular openings, the method further comprising:

filtering contaminants with each filter of the plurality of filters.

11. The method of claim 9 wherein the rectangular support member of the at least one filter has a curved portion and the seal member has a curved portion corresponding in shape to the curved portion of the rectangular support member, the curved portion of the rectangular support member sealingly contacting the curved portion of the seal member, the method further comprising:

inhibiting fluid leakage with the seal member.

12. A filter system for filtering fluid, the filter comprising:

a mount apparatus having at least one rectangular mount opening therethrough for emplacement therethrough of part of a filter, at least one filter having a rectangular support member and filter material connected to the rectangular support member, the filter material suitable for insertion through the at least one rectangular mount opening of the mount apparatus, the rectangular support member having a rectangular fluid opening through which the fluid is flowable to the filter material, an interface between the rectangular support member of the at least one filter and the mount apparatus, and a seal member encompassing the rectangular support member/mount apparatus interface and interposed therebetween to inhibit fluid leakage through said interface, a filter seal member around the rectangular opening, and a mount apparatus seal member around the at least one rectangular mount opening.

13. The filter system of claim 12 wherein the seal member is secured to the rectangular support member.

14. The filter system of claim 12 wherein the seal member is secured to the mount apparatus.

15. The filter system of claim 12 wherein the at least one rectangular mount opening of the mount apparatus is a plurality of rectangular openings, and wherein the at least one filter is a plurality of filters, one filter corresponding to each of the plurality of rectangular openings.

16. The filter system of claim 12 wherein the filter seal member sealingly contacts the mount apparatus seal member.

17. The filter system of claim 12 wherein the rectangular support member of the at least one filter has a curved portion and the seal member has a curved portion corresponding in shape to the curved portion of the rectangular support member, the curved portion of the rectangular support member sealingly contacting the curved portion of the seal member.

* * * * *